United States Patent

[11] 3,583,800

| | | |
|---|---|---|
| [72] | Inventor | Hiroshi Hirata<br>Sakai, Japan |
| [21] | Appl. No. | 804,069 |
| [22] | Filed | Mar. 4, 1969 |
| [45] | Patented | June 8, 1971 |
| [73] | Assignee | Minolta Camera Kabushiki Kaisba<br>Osaka, Japan |
| [32] | Priority | Mar. 8, 1968, Mar. 27, 1968 |
| [33] | | Japan |
| [31] | | 43/18,094 and 43/24,258 |

[54] DEVICE FOR CHECKING DRIVING BATTERY VOLTAGE IN A MOTION-PICTURE CAMERA WITH A WIDE RANGE OF FRAME SPEED
5 Claims, 3 Drawing Figs.

[52] U.S. Cl..................................................... 352/170,
324/29.5, 352/180
[51] Int. Cl.................................................. G03b 17/18
[50] Field of Search........................................... 352/170,
180; 324/29.5

[56] References Cited
UNITED STATES PATENTS

| 1,993,444 | 3/1935 | Haskins......................... | 324/29.5 |
| 3,200,720 | 8/1965 | Drasch........................... | 352/180 |

FOREIGN PATENTS

| 11,318 | 12/1923 | Netherlands.................. | 352/180 |

Primary Examiner—Louis R. Prince
Assistant Examiner—Denis E. Corr
Attorney—Waters, Roditi, Schwartz and Nissen ABSTRACT: A device for checking the battery voltage for a motion picture camera which is capable of shooting with any of a plurality of frame speeds. The device checks whether the voltage of the power source battery is sufficient for the shooting at a certain frame speed, and the value of voltage required for shooting at that speed is set. An electric circuit for the checking device is adjusted in cooperation with the selection of the frame speed.

DEVICE FOR CHECKING DRIVING BATTERY VOLTAGE IN A MOTION-PICTURE CAMERA WITH A WIDE RANGE OF FRAME SPEED

This invention relates to a device for checking the driving battery voltage in a motion-picture camera with a wide range of frame speed (hereinafter called merely "frames") and more particularly to a device for checking whether or not the voltage of the driving batteries is above a certain level for guaranteeing camera operation over a wide range of shooting speed, such as 64, 48, 32, 24, 18, 12 and 8 frames per second. Response to the change in the number of frames is so small that the driving current can be considered to be constant in a certain range of frames.

Generally, it is known that a battery has such characteristics that when the battery is connected with a load to supply power thereto, there occurs a voltage drop in the battery due to the internal resistance, and that the voltage applied across the load is correspondingly affected. Therefore, when we check voltage of a power source battery for driving a motor of a motion picture camera, it is important to consider the internal voltage drop of the battery. Accordingly, in present checking devices, the resistance value corresponding to the impedance in the driving motor is set in a checker circuit, and the voltage of the battery is checked by observing whether or not the terminal voltage occurring across the resistor by the current flowing therethrough is greater than a predetermined level or below.

Generally, it is also known that the internal impedance of the motor increases in proportion to its rate of speed. Therefore, most known battery checkers employed in motion picture cameras have, in their checking circuit, a resistor having resistance value corresponding to the internal impedance of the motor which is adjusted so as to provide in the camera a shooting of maximum speed of film or maximum speed or frequency of frame, for instance, 24 frequencies of frames per second in a camera capable of shooting by frame speeds or frequencies of 24, 18 and 12, whereby the voltage value across the resistor is checked to observe whether the battery voltage is higher than the limit voltage necessary for shooting at maximum frame speed or frequency. In other words, known battery checkers check the voltage for the maximum frame speed and use the checked value for checking the voltage of the battery over the entire range of frame speeds.

However, so that the impedance of the driving motor is in proportion to the speed, the internal impedance of the driving motor at low frame speeds, except for the maximum frame frequency, is lower than that with the latter, and thus the guaranteed voltage as determined by the known battery checkers inaccurately check at the lower frame speed.

This voltage inaccuracy is not large if the range of frame speeds is comparatively narrow, for instance, 24, 18 and 12 frames per second. However, if the range of frame speeds becomes very wide, such as a range covering 64, 48, 32, 24, 18 and 12 frames per second, the voltage inaccuracy becomes large, and the known voltage checking device guarantees a driving voltage for the maximum number of frames (e.g., 64), which is not usually used, and provides a too large an allowance or tolerance for the minimum number of frames per second. Furthermore, the driving voltage high enough for most frequently used number of frame speeds (e.g., 24, 18 and 12 frames) in a very wide range may be determined by the known voltage checking device to be insufficient, and the utility of the driving batteries is unduly and extensively curtailed. Thus, the known voltage checking device has noticeable drawbacks.

Accordingly, there is a need for overcoming the aforesaid difficulty of the known battery checker in a motion-picture camera having a wide range of frame speeds, so as to make full use of the driving batteries.

There is no motion-picture camera available at present which meets the aforesaid need by incorporating a suitable battery checker. It has been proposed to add a tachometer to a motion-picture camera in order to facilitate checking whether or not a given voltage is sufficient for each frame speed chosen. According to the proposed scheme, the driving speed of the motion-picture camera is at first measured, and the checking of an effective driving voltage is carried out indirectly by using the driving speed thus measured, so as to improve the utility of the driving batteries. As a result, unless a camera driving motor is actuated, it is impossible to check whether or not the driving batteries have sufficient voltage for a selected frame speed. Thus, it becomes necessary to check the available range of frame speeds prior to loading a film in the camera, by operating the camera without film. If such checking is made before loading the film, the driving battery voltage should be checked while shooting to find whether a particular frame speed can be run with a given driving voltage.

Therefore, an object of the present invention is to provide an improved battery checking means for a motion picture camera capable of shooting at various frame speeds extending over a wide range, which eliminates the necessity of the tachometer as referred to above and includes in the checker circuit a resistor, the resistance value of which is adjusted in cooperation with the selection of frame speed so as to correspond with the internal impedance of the driving motor speed in accordance with the selected frame speed, whereby the limit voltage for each frame speed is checked by a single or common calibration with which the current flowing through the checker circuit is gauged, and thus the utility of the battery is improved.

Another object of this invention is to provide a battery checking device for a camera as set forth above, wherein the range of frame speeds is divided into a plurality of groups, and resistance value of the resistors is selected in cooperation with the frame speed selected so as to correspond with the internal impedance of the rotating motor to attain the maximum frame speed which is included in each group of frame speeds, whereby the limit voltage for each frame speed is checked at every group.

A further object of this invention is to provide a battery checking device for the camera set forth above, wherein the battery checker circuit has a variable resistance arranged therein, the resistance value of which is adjusted in cooperation with the selection of the frame speed, whereby suitable resistance values corresponding to the internal impedance of the driving motor is set in the checker circuit on selection of respective frame speeds.

A still further object of this invention is to provide a battery checker circuit for a camera to which a particular power source is applied when a shooting at a high frame speed is carried out, wherein a combination of resistance is changed in cooperation with the application of the particular power source, whereby limit voltages for shooting by high and low frame speeds are checked respectively.

Other objects and a fuller understanding of the present invention may be had by referring to the following description, taken in conjunction with the accompanying drawings, in which.

Figure 1:
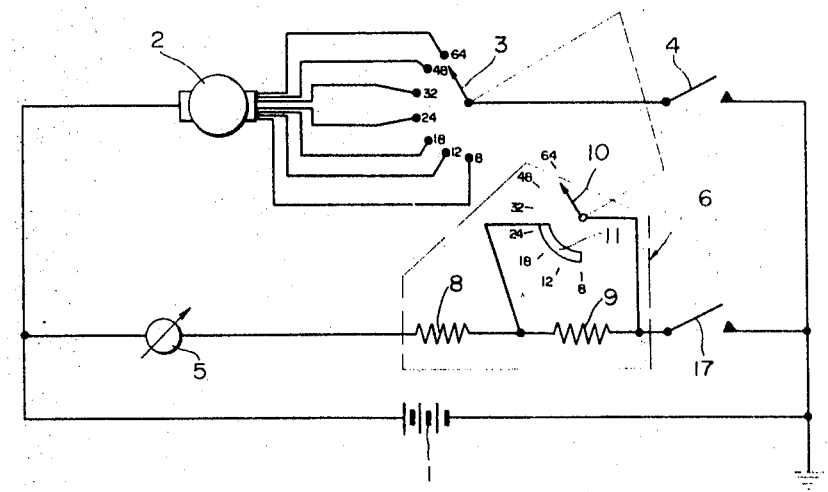
FIG. 1 is a circuit diagram of an embodiment of the present invention, in which a given range of frame speeds is divided into two groups for effecting a checking operation relative to each group.

In the circuit diagram of FIG. 1, a wide range of frame speeds, including 64, 48, 32, 24, 18, 12, and 8 frames per second, is divided into two groups; namely a first group covering 64 frames to 32 frames per second, and a second group covering 24 frames to 8 frames per second. Batteries 1, a driving motor 2, a frame speed selector switch 3, and a release switch 4 constitute a driving circuit. A battery voltage checking circuit consists of a battery checker or galvanometer 5 of a conventional design, a resistor assembly 6 for checking the limit voltage of the driving batteries, and a checker switch 7, all connected in series, and the battery voltage checking circuit is connected across the batteries 1 in parallel therewith. The resistor assembly 6 includes a resistor element 8 having resistance values corresponding to the internal impedance of the driving motor 2 rotating to achieve a photographing of 24 frames per second, a resistor element 9 together with which the element 8 produces a combined resistance value corresponding to the internal impedance of the driving motor 2 rotated to attain a photographing at 64 frames per second, and a switch 10 electrically connected across the resistor element 9 and mechanically interconnected with the frame selector switch 3 so as to be gang operated therewith, as illustrated in the figure. The resistor element 8 is connected in series with the resistor element 9, and the switch 10 is connected in parallel with the resistor element 9. The switch 10 incorporated in the resistor assembly 6 has a stationary contact 11 connected to the junction point between the resistor elements 8 and 9 and a selector arm connected to the junction point between the resistor element 9 and the checker switch 7. For high speed shooting (64, 48 and 32) which are not usually used, the selector arm is at such angular positions that a circuit between the selector arm and the contact is open, while for low frame speeds (24, 18, 12 and 8 frames), the selector arm is kept in c contact with the contact 11.

When a shooting speed of 64 frames per second is selected, as shown in FIG. 1, the battery voltage checking circuit is completed upon closing of the checker switch 7, and the galvanometer 5 indicates whether or not the voltage of the batteries 1 is above a limit voltage guaranteeing the 64 frame shooting speed, by using both the resistor element 8 and the resistor element 9 with the limit voltage changeover switch 10 being open under such conditions. It is apparent that when the frame speed selector 3 is at the 48 frame position or at the 32 frame position, the galvanometer or battery checker 5 gives the same indication as the aforesaid indication for the shooting speed of 64 frames per second.

If the galvanometer 5 indicates that the voltage of the batteries 1 is below the limit voltage guaranteeing the high speed shooting with the frame selector 3 in the range 64 to 32 frames per second, or if insufficient voltage of the batteries 1 for such high speed shooting is indicated, the frame selector 3 may be turned to the 24 position (or to the 18, 12 or 8 frame position). Then, the selector arm of the switch 10 is gang operated with the frame speed selector switch 3 and is brought into contact with the cooperating stationary contact 11, so that the resistor element 9 of the resistor assembly 6 is short-circuited by the changeover switch 10. The characteristic of the battery voltage checking circuit is such that, with the resistor element 9 shunted through the switch 10, the galvanometer or battery checker 5 indicates whether or not the batteries 1 have voltage higher than another limit voltage guaranteeing a shooting speed of 24 frames per second. Such indication of the voltage of the batteries 1 by the battery checker 5 is based on the magnitude of the current through the galvanometer 5. As pointed out in the foregoing, the magnitude of the driving current through the driving circuit (not shown) of a motion-picture camera (not shown) is substantially constant for a comparatively narrow range of shooting speeds, and the limit voltage guaranteeing the shooting at a given speed is reduced as the shooting speed becomes slower. Accordingly, if the galvanometer 5 indicates that the batteries 1 have a voltage lower than the limit voltage for 64 frames but higher than for 24 frames, the batteries 1 are still usable for the low speed group covering 24, 18, 12 and 8 frames, and hence the batteries need not be replaced as long as the shooting is made in the low speed group of frames.

Figure 2:
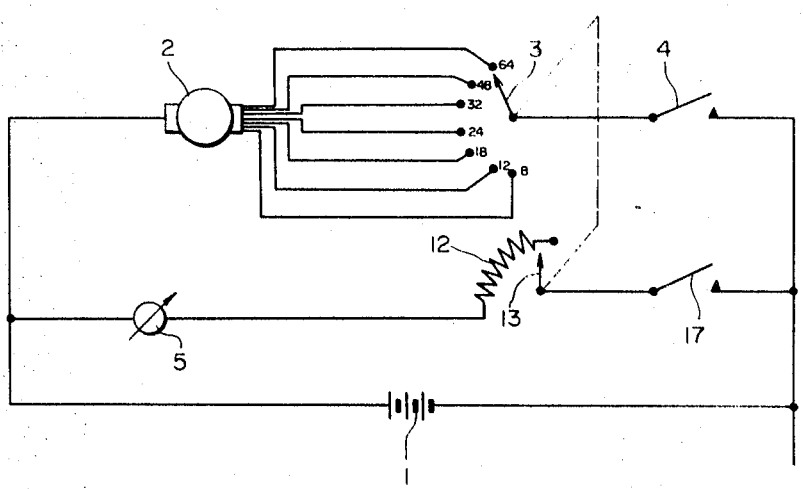
FIG. 2 is a circuit diagram of another embodiment of the invention, in which checking is effected for each frame speed.

In the aforesaid first embodiment of the present invention, a wide range of different shooting speeds of a motion-picture camera are divided into two groups, and the voltage of the driving batteries is checked for the two groups of shooting speeds, respectively. FIG. 2 illustrates another embodiment of the invention (parts similar to those of FIG. 1 are designated by similar reference numerals), in which the resistor assembly 6 is substituted for by a rheostat 12 consisting of a resistor and a slider arm 13 gang operated with a frame speed selector switch 3, so that the resistance value of the rheostat 12 can be automatically varied for facilitating the checking of the driving battery voltage relative to the internal impedance of the driving motor rotated for guaranteeing each of the different shooting speeds, respectively. With such rheostat 12, a battery voltage checker such as a galvanometer 5 can indicate whether or not the voltage of batteries 1 is higher than a limit voltage guaranteeing camera operation at a given speed, which limit speed can be set individually for each shooting speed or each number of frames per second. Thus, with the circuit construction of FIG. 2, the driving battery voltage can be checked relative to each of the limit voltages present for each of the various selectable shooting speeds, so that the utility of the driving batteries can be further improved.

As can be seen from the above embodiments, by using the device for checking the driving battery voltage according to the present invention, the voltage of the driving batteries can be checked by comparing with a limit voltage guaranteeing camera operation at a particular shooting speed or at the highest number of frames per second in each of divided groups the over the full range covering the highest shooting speed to the lowest shooting speed of the camera. Accordingly, if the driving batteries have a voltage lower than the limit voltage guaranteeing a high speed shooting or shooting at one of high group of speeds but higher than another limit voltage guaranteeing a low speed shooting or shooting at one of the low group of speeds, the driving batteries can be used for the low speed shooting without replacement. Thus, the driving batteries can be used to their full capacity. Furthermore, with the device according to the present invention, an operator need not make any separate switching operation for changing the limit voltage when a change is made in the shooting speed, either between divided stages of shooting speeds or among individual shooting speeds. The driving battery voltage can be checked simply by closing a checker switch because upon turning of a speed selector switch, a limit voltage switch is gang operated so as to effect continuous checking of the driving battery voltage relative to different limit voltages guaranteeing individual selected shooting speeds or selected groups of shooting speeds, respectively. Thus, the available shooting speed for given driving batteries can easily be checked. In addition with the device of the present invention, the driving battery voltage can be checked relative to limit or minimum voltages without necessitating actuation of a camera driving motor, which was necessary in known motion-picture cameras equipped with tachometers.

Figure 3:
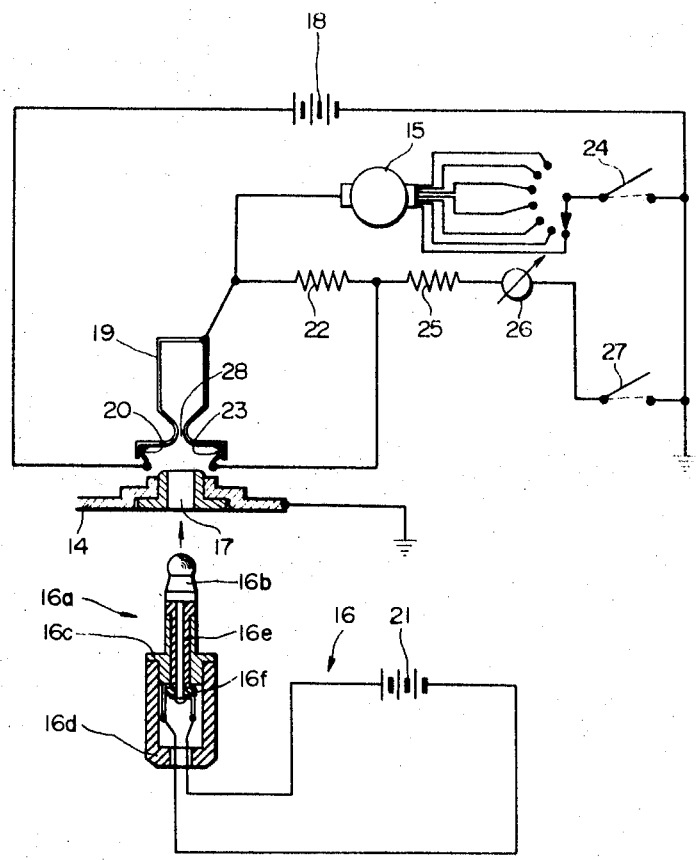
FIG. 3 is a circuit diagram of a further embodiment of the present invention, which includes a portion for a high group of frame speeds and another portion for a low group of frame speeds, so that separate driving batteries can be used for effecting high speed shooting.

FIG. 3 illustrates a further embodiment of the device according to the present invention. A camera body 14 has a receptacle 17 adapted to receive a plug 16a of a battery assembly 16 for actuating a driving motor 15 at a speed in a high speed shooting range covering 64, 48 and 32 frames per second. When the plug 16a of the battery assembly 16 is separated from the receptacle 17, as shown in the figure, the motion-picture camera (not shown) is driven by batteries 18 used for low speed motion. In other words, the batteries 18 are used for driving the camera in a low group of shooting speeds (e.g., 24, 18, 12 and 8 frames per second). Under the illustrated circuit conditions, a contact 19 disposed at the back of the receptacle 17 has one end kept in contact with a stationary contact 20 connected to the batteries 18 and the other end of the contact 19 is kept in contact with another stationary contact 23 for shunting a resistor element 22 for checking the batteries 21 of the battery assembly 16 for the group of high shooting speeds. The contact 19 is connected to circuit consisting of a camera driving motor 15 and a release switch 24 and to another circuit including the resistor element 22 for checking the batteries 21, another resistor element 25 for checking both batteries 18 and 21, a battery checker 26 such as a galvanometer and a checker switch 27.

The battery assembly 16 for the high shooting speeds comprises the plug 16a and the batteries 21. The plug 16a includes a conductive stem 16b, a conductive cylinder 16c, an insulating outer cylinder 16d, and insulating members 16e and 16f for insulating the stem 16b from the cylinder 16c. When the plug 16a is inserted in the receptacle 17, the stem 16b engages a contracted portion 28 of the contact 19, so as to move the opposing end of the contact 19 away from each other. Thus, the circuit between the contact 19 and the stationary contact 20 and the other circuit between the contact 19 and the other stationary contact 23 are interrupted. The conductive cylinder 16c is grounded to the camera body 14 through the receptacle 17, when the plug is inserted in the receptacle. The stem 16b of the plug 16a is connected to one terminal of the batteries 21, while the cylinder 16c is connected to the opposite terminal of the batteries 21.

As can be seen from the figure, the voltage of the batteries 18 for low frame speeds can be checked by a battery voltage checking circuit tracing from one terminal of the batteries 18, through the stationary contact 20, the contact 19, the other stationary contact 23, the resistor element 25, the galvanometer 26, and the checker switch 27, and back to the opposite terminal of the batteries 18. The voltage of the high speed (e.g., 64, 48 and 32 frames) driving batteries 21 is checked by completing another battery voltage checking circuit by inserting the plug 16a in the receptacle 17, which circuit traces from one terminal of the batteries 21, through stem 16b, the contact 19, resistor elements 22, 25, the galvanometer 26, and the checker switch 27, and back to the other terminal of the batteries 21 which other terminal is grounded through the cylinder 16c and the receptacle 17 secured to the camera body 14. Thus, for the high speed and low speed groups the battery voltage checking circuit can be automatically changed over between the high speed checking circuit and the low speed checking circuit in response to the insertion and removal of the battery assembly 16 into and away from the camera body.

The operation of the embodiment of FIG. 3 will now be described. During camera operation in the low speed group, the battery voltage checking circuit for the driving batteries 18 is completed upon closing of the checker switch 27, so that the galvanometer 26 indicates the voltage condition of the batteries 18. When the plug 16a of the high speed battery assembly 16 is inserted in the receptacle 17 of the camera body 14 for effecting high speed shooting, the contact 19 is separated from both the stationary contact 20 and the other stationary contact 23 by the stem 16b. Then, upon closing of the checker switch 27, the other battery voltage checking circuit for the high speed driving batteries 21 is completed, so that the galvanometer 26 indicates the voltage condition of the batteries 21.

As described in the foregoing, according to the present invention, the voltage checking of the driving batteries for low and high shooting speeds is effected separately, so that the utility of the batteries is greatly improved. Furthermore, the changeover of the battery voltage checking circuits can be carried out very easily in an automatic fashion in response to the mounting and the separation of the battery assembly for high speeds to the motion-picture camera.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. A device for checking voltage of a power source battery in a motion picture camera driven by a driving motor and capable of shooting with various frame speeds over a wide range, comprising;

a galvanometer for indicating whether electric current flowing through it is greater of less than a predetermined level;

an electric driving motor for driving the film in the camera at varying speed; means to select the speed of operation of said motor;

a resistor assembly connected in series with said galvanometer, means for varying the resistance value of said resistor assembly in response to the selection of a frame speed and corresponding with the internal impedance of said driving motor while running at the selected frame speed;

said galvanometer and resistor assembly forming a circuit to be connected to the power source battery, said circuit being connected in parallel with the driving motor.

2. A device as claimed in claim 1, wherein the range frame speeds are divided into a plurality of groups, and said resistor assembly having a resistance value corresponding with the internal impedance of the driving motor while running to provide a shooting at the respectively highest frame speed in each group of the frame speeds, said resistance values being selected in response to the selection of the frame speed.

3. A device as claimed in claim 1, including a frame speed selector, the resistor assembly including a rheostat with a slider arm gang operated with said frame speed selector to change the effective resistance of the rheostat in response to the selection of the frame speed.

4. A device as claimed in claim 1, wherein the resistor assembly consists of a first resistor for checking the voltage of a first battery applied for the shooting at low frame speeds and a second resistor associated with the first resistor for checking the voltage of a second battery, said second battery being substituted for said first battery by inserting said second battery in the motor driving circuit for shooting at high frame speeds, and a short circuit across the second resistor, said short circuit being opened on the insertion of the second battery.

5. A device as claimed in claim 4, including plug means insertable in a camera body, said plug means operating to interrupt the electrical connection between the first battery and said motor and device, and electrically connect the second battery and the device and open said short circuit for the second resistor.